United States Patent [19]

McIlvried et al.

[11] 4,086,158

[45] Apr. 25, 1978

[54] PROCESS FOR UPGRADING SOLIDS-CONTAINING LIQUID HYDROCARBON OILS

[75] Inventors: Howard G. McIlvried, Pittsburgh; Angelo A. Montagna, Monroeville, both of Pa.

[73] Assignee: Gulf Research & Development Company, Pittsburgh, Pa.

[21] Appl. No.: 726,146

[22] Filed: Sep. 24, 1976

[51] Int. Cl.$^2$ .................. C10G 23/02; C10G 23/16
[52] U.S. Cl. ................................... 208/264; 208/216; 208/251 H
[58] Field of Search ............ 208/143, 146, 264, 251 H

[56] References Cited

U.S. PATENT DOCUMENTS 2,985,582  5/1961  Oettinger ........................... 208/108
3,575,847  4/1971  Sprow et al. ...................... 208/108

OTHER PUBLICATIONS

U.S. Stoneware, "Tower Packings", Bulletin TP54, 1957, pp. 1, 6 & 7.

Primary Examiner—Herbert Levine

[57] ABSTRACT

A process is provided for the upgrading of solids-containing liquid hydrocarbon oils derived from coal, oil shale and tar sands. The process comprises passing the solids-containing liquid hydrocarbon oil, together with hydrogen, through the void spaces of a fixed catalyst bed wherein the total void volume is within defined critical limits.

14 Claims, 7 Drawing Figures

PROCESS FOR UPGRADING SOLIDS-CONTAINING LIQUID HYDROCARBON OILS

BACKGROUND OF THE INVENTION

1. Field of the Invention

This invention relates to an improved process for the conversion of solids-containing liquid hydrocarbon oils, particularly solids-containing liquid hydrocarbon oils derived from coal, oil shale and tar sands. By "liquid hydrocarbon oils" we mean to include the organic liquid obtained from the physical and/or chemical treatment of coal, oil shale and tar sands. These "liquid hydrocarbon oils" can contain compounds of sulfur, oxygen nitrogen and other elements, as well as pure hydrocarbons.

Liquid hydrocarbon oils can contain solids that can interfere with subsequent processing thereof. These solids can be those which find their way into the liquid hydrocarbon oils during production thereof while in storage or during processing. Solids-containing liquid hydrocarbon oils that are preferably treated herein are solids-containing liquid hydrocarbon oils derived from coal, oil shale and tar sands.

These liquid hydrocarbon oils are old in the art and well-known and can be obtained in many ways. Reference, for example, for obtaining or producing these oils can be found in Kirk-Othmer Encyclopedia of Chemical Technology, Second Edition, 1969, John Wiley & Sons, Inc., New York, N.Y.: Volume 5, pages 606 to 678, for liquid hydrocarbon oils derived from coal; Volume 18, pages 1 to 20, for liquid hydrocarbon oils derived from oil shale; and Volume 19, pages 682 to 732, for liquid hydrocarbon oils derived from tar sands.

While these liquid hydrocarbon oils vary greatly in their composition, in the main they are composed of mono and polynuclear aromatic compounds, some of which can include chemically combined sulfur, nitrogen and/or oxygen. In general, their approximate composition, on a moisture-free, solids-free basis, can be as follows:

TABLE I

| | Weight Per Cent | |
|---|---|---|
| | Broad Range | Narrow Range |
| Carbon | 80–95 | 83–92 |
| Hydrogen | 5–15 | 5–13 |
| Nitrogen | 0.1– 4 | 0.1– 3 |
| Oxygen | 0.1– 4 | 0.1–2.5 |
| Sulfur | 0.1–10 | 0.1– 5 |

The solids that can be associated with the above-identified liquid hydrocarbon oils will contain in excess of about 50 weight percent of inorganic components, generally from about 60 to about 98 weight percent. Generally, these inorganic components will be, for example, iron compounds, such as iron pyrite; silica containing compounds, such as quartz, kaolin, mica, montmorillonite and zeolites; metal carbonates, such as calcite, dolomite and nahlcolite; etc. Based on the weight of the liquid hydrocarbon oil, the solids content thereof will be in the range of about 0.1 to about five weight percent, generally about 0.1 to about two weight percent.

The procedure defined herein can be used to improve the physical properties of the liquid hydrocarbon oil, for example, to reduce its specific gravity, pour point and/or viscosity and/or improve the chemical properties of the liquid hydrocarbon oil, for example, reduce its sulfur, oxygen and/or nitrogen content.

In order to upgrade (that is, improve the physical and/or chemical properties) liquid hydrocarbon oils, it is conventional to pass the same, together with hydrogen, through a catalyst-containing ebullating bed reactor or through a catalyst-containing fixed-bed reactor. With an ebullating bed, attrition rates in the reactor are high and catalyst losses are severe. When the liquid hydrocarbon oil being treated additionally contains solid materials, as herein, even poorer results are obtained because the presence of solid materials in the liquid hydrocarbon oils aggravates the attrition problems. Conventional fixed bed reactors work well when treating solids-free liquid hydrocarbon oils. However, when the liquid hydrocarbon oil being treated contains more than a few parts per million of solids, conventional fixed bed reactors quickly plug and become inoperable. Treating solids-containing liquid hydrocarbon oils in accordance with the process defined and claimed herein not only substantially reduces these attrition and plugging problems but, at the same time, results in the production of a liquid hydrocarbon oil having enhanced physical and/or chemical properties.

2. Description of the Prior Art

U.S. Pat. No. 2,985,582 to Oettinger discloses the removal of ash from crude oils, tars and their residues by heating said materials to a temperature of at least 250° C. and then contacting the heated material with large-surfaced substances. In U.S. Pat. No. 3,575,847 Sprow et al. subject the liquid product from a coal liquefaction zone to hydrocracking in the presence of spherical hydrogenation catalysts.

The process of the invention, in general, comprises passing a solids-containing liquid hydrocarbon oil, together with hydrogen, into the reaction vessel referred to and described more fully hereinbelow. The reaction vessel contains a hydrogenation catalyst and is maintained under normal hydrogenating pressures and temperatures. After hydrogenation the solids that were present in the charge can be removed from the product stream. The balance of the product stream can thereafter be subjected to distillation to obtain products of various boiling ranges. Some of the products are useful per se as fuels. The remainder can be further treated by conventional petroleum processes including cracking, hydrocracking, hydrotreating and the like.

In accordance with the present invention, the solids-containing liquid hydrocarbon oil is contacted with hydrogen in the presence of a hydrogenation catalyst at a temperature between about 260° to about 480° C., preferably about 340° to about 430° C., at a pressure of about 500 to about 10,000 pounds per square inch gauge (about 35 to about 703 kilograms per square centimeter), preferably about 1000 to about 4000 pounds per square inch gauge (about 70 to about 281 kilograms per square centimeter), utilizing a weight hourly space velocity between about 0.25 to about 50 pounds of liquid hydrocarbon oil per pound of catalyst per hour (about 0.2 to about 50 kilograms of liquid hydrocarbon oil per kilogram of catalyst per hour), preferably about 1.0 to about 25 pounds of liquid hydrocarbon oil per pound of catalyst per hour (about 1.0 to about 25 kilograms of liquid hydrocarbon oil per kilogram of catalyst per hour), and added hydrogen in amounts between about 1000 to about 20,000 standard cubic feet per barrel of solid-containing liquid hydrocarbon oil (about 178 to about 3560 cubic meters per cubic meter of solids-containing liquid hydrocarbon oil) preferably between about 2000 to about 12,000 standard cubic feet per barrel of solids-containing liquid hydrocarbon oil (about 356 to about 2136 cubic meters per cubic meter of solids-containing liquid hydrocarbon oil). The exact conditions selected will depend on the catalyst, the particular charge stock to be treated, and the degree of physical and/or chemical conversion desired, etc. It is desirable to utilize as low a temperature as possible and still obtain the desired results. This is due to the fact that the rate of coke formation and the rate of catalyst deactivation becomes more pronounced at higher reaction temperatures. The hydrogen recycle rate does not vary significantly with various charge stocks and should be, for example, between about 1000 to about 15,000 standard cubic feet per barrel of solids-containing liquid hydrocarbon oil (about 178 to about 2670 cubic meters per cubic meter of solids-containing liquid hydrocarbon oil), preferably about 2000 to about 10,000 standard cubic feet per barrel of solids-containing liquid hydrocarbon oil (about 356 to about 1780 cubic meters per cubic meter of solids-containing liquid hydrocarbon oil).

Any catalytic component having hydrogenation activity, these being well-known to those having ordinary skill in the art, can be employed herein, but preferably the catalyst which is employed in the process of the invention comprises at least one hydrogenating component selected from the group consisting of the metals, metal sulfides and/or metal oxides of Groups VI and VIII of the Periodic Table. Particularly preferred among the hydrogenating metals are nickel, cobalt, molybdenum and tungsten. Particularly desirable catalysts comprise (a) a combination of about 2 to about 25 percent (preferably about 4 to about 16 percent) by weight molybdenum and at least one of the iron group metals where the iron group metals are present in such amounts that the atomic ratio of the iron group metals with respect to molybdenum is less than about 1.0 and (b) a combination of about 5 to about 40 percent (preferably about 10 to about 25 per cent) by weight of nickel and tungsten where the atomic ratio of tungsten to nickel is about 0.1:1 to about 5:1 (preferably about 0.3:1 to about 4:1), said hydrogenating component being composited with a porous support. These Group VI and Group VIII catalysts can employ promoters at levels not in excess of about eight percent, but preferably lower than about five percent. The best promoters are the elements of Groups II and IV. The most preferred ones are Ti, Zr, Sr, Mg, Zn and Sn. Catalysts of type "(a)" may contain molybdenum in the amounts conventionally used, i.e., about 2 to about 25 percent molybdenum based on the total weight of the catalyst including the porous carrier. Smaller amounts of molybdenum than about 2 percent may be used, but this reduces the activity. Larger amounts than about 25 percent can also be used but do not increase the activity and constitute an expense. The amounts of the iron group metals in "(a)" and "(b)" may be varied as long as the above proportions are used. However, in "(a)" we prefer to utilize two iron group metals, each in an atomic ratio to molybdenum between about 0.1 and about 0.2. All of the iron group metals may be present but we prefer to use only two. However, only one iron group element is employed when a group IVB promoter is used. The amount of the hydrogenating component based on the metal itself can suitable be from about 0.5 to about 40 percent by weight of the catalyst including the porous carrier, but is usually within the range of about 2 to about 30 percent by weight of the catalyst including the carrier.

When using a catalyst of type "(a)", we prefer to utilize one containing about 4 to about 16 percent by weight molybdenum, most preferably about 8 percent; about 0.2 to about 10 percent by weight nickel, most preferably about 0.5 percent; and about 0.5 to about 5 percent by weight cobalt, most preferably about 1.0 percent. When using a catalyst of type "(b)", we prefer to utilize one containing about 15 to about 25 percent (e.g., about 19 percent) tungsten and about 2 to about 10 percent (e.g., about 6 percent) nickel supported on a porous carrier, such as alumina.

The above-mentioned active hydrogenating components can also be present as mixtures. On the other hand, chemical combinations of the iron group metal oxides or sulfides with the Group VI oxide and/or sulfide can also be utilized. The catalytic hydrogenating components can be used with a variety of highly porous bases or supports which may or may not have catalytic activity of their own. Examples of such supports are alumina, bauxite, silica gel, kieselguhr, thoria, zirconia, molecular sieves or other zeolites, both natural and synthetic, or mixtures of the foregoing, as long as the particular catalyst support which is employed has pores sufficiently large to avoid quick plugging by the deposition of the ash and/or organo-metallic constituents of the solids-containing liquid hydrocarbon oil used as charge stock. By "highly porous" and "pores sufficiently large" is meant a pore volume of from about 0.1 to about 1.0 cc. per gram, preferably from about 0.25 to about 0.8 cc. per gram; a surface area from about 50 to about 450 m$^2$/gram, preferably from about 80 to about 300 m$^2$/gram; a pore radius size range (as measured with $N_2$) from about 10 A to about 300 A with the average pore radius being from about 20 A to about 150 A. The catalyst will be more fully described hereinafter.

When treating a solids-containing liquid hydrocarbon oil according to the process of the invention, it is customary to continue the reaction until the catalyst activity has decreased markedly due to the deposition of ash and/or coke or other carbonaceous material thereon. In the process of the present invention the reaction will continue over an extended period of time before regeneration of the catalyst is required. When regeneration of the catalyst becomes necessary, the catalyst can be regenerated by combustion, i.e., by contact with an oxygen-containing gas such as air at an elevated temperature usually about 480° C. or by any other means normally used to regenerate hydrogenation catalysts. The manner in which the catalyst is regenerated does not constitute a portion of the present invention.

BRIEF DESCRIPTION OF THE DRAWINGS

Referring to FIG. 1, a solids-containing liquid hydrocarbon oil is introduced into the system by line 2 and hydrogen by line 4. The resulting mixture in line 6 is then passed upwardly into reaction vessel 8. If desired, the mixture in line 6 can be preheated by any suitable heat exchange means (not shown) prior to being introduced into reaction vessel 8. While the mixture of oil and hydrogen is shown as being introduced into the bottom of reaction vessel 8 for upflow operation, the mixture can be introduced into the top of reaction vessel 8 for downflow operation. Preferably, however, the mixture of oil and hydrogen is introduced into the bottom of reaction vessel 8 and passed upflow through reaction vessel 8 in a flooded-bed type reaction system. While the hydrogen is shown as being introduced together with the oil into the bottom of reaction vessel 8, the hydrogen can be introduced at multiple places through the reaction vessel. The hydrogen gas stream is preferably at least about 60 percent hydrogen, the remainder of the gas stream being gases such as nitrogen, carbon monoxide, carbon dioxide and/or low molecular weight hydrocarbons, such as methane. The gas flow rate is maintained at a velocity substantially above laminar flow; that is, the modified Reynolds number $N'_{Re}$, assuming for calculational purposes that the gas is essentially the only medium flowing through the reactor void volume (defined hereinbelow), is substantially greater than 10, as this number is defined in "Perry's Chemical Engineer's Handbook", McGraw-Hill, New York, 4th Edition, 1967, pages 5-50 and 5-51. Generally, $N'_{Re}$ should be > 100, preferably > 500.

The catalyst 10 can be any hydrogenation catalyst as defined hereinabove, but the catalytic components thereof are preferably composed of molybdenum, nickel and cobalt or titanium combined with a carrier, such as alumina, and the catalyst substantially fills the space in reaction vessel 8 between a supporting grid 12 and a retaining screen 14. It is imperative in the practice of this invention that the catalyst be such that, when supported in place, the reactor void volume in the reaction bed be within defined critical limits in order to obtain the desired hydrogenation without appreciably increasing the pressure drop across the catalyst bed. By "reactor void volume" we mean the percent free gas space, exclusive of the pores in the catalyst particles, lying between grid 12 and screen 14. We have thus found that the reactor void volume must be from about 50 to about 90 volume percent, preferably about 50 to about 80 volume percent of the catalyst bed.

Figure 1:
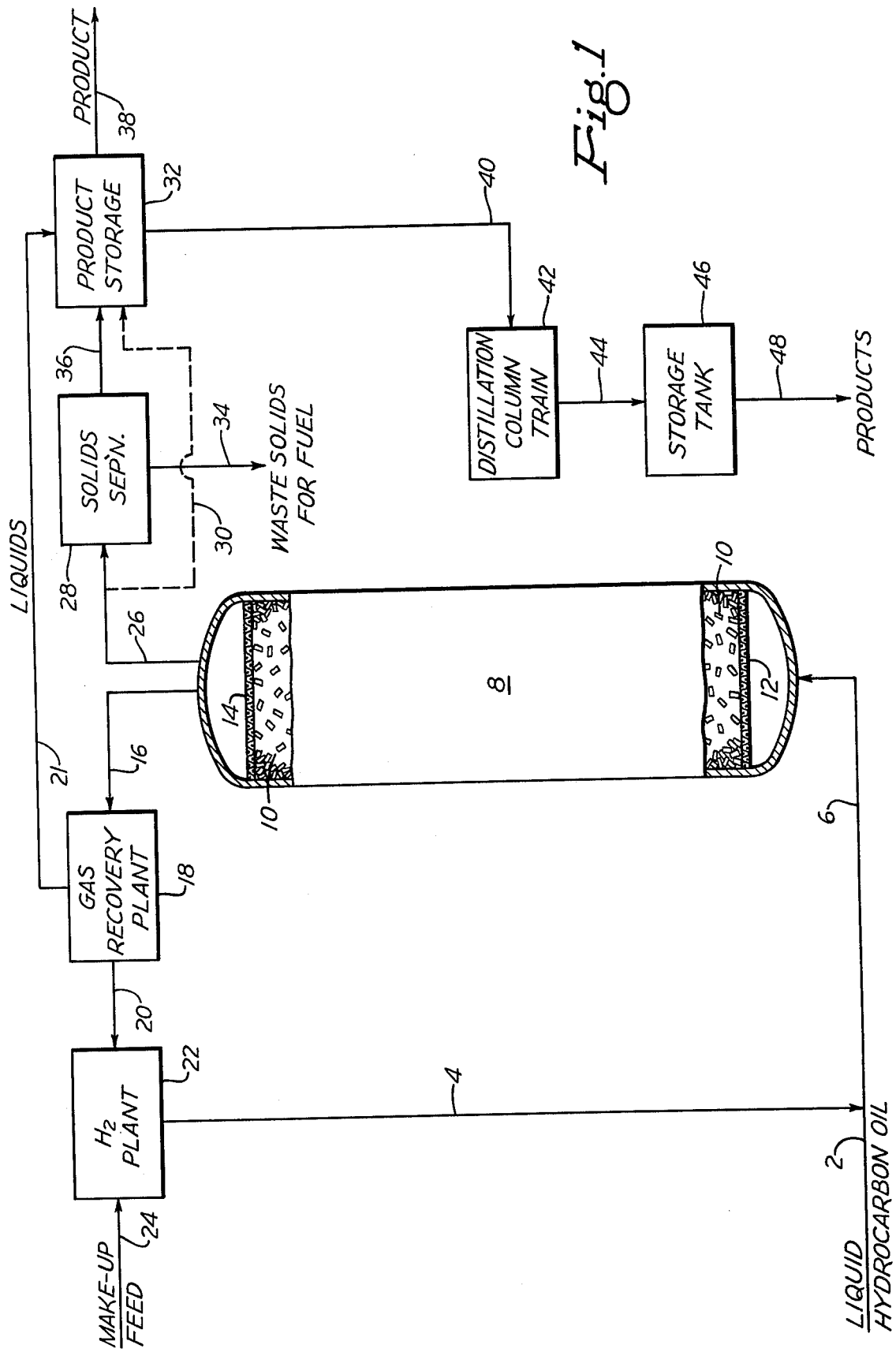
FIG. 1 is a schematic flow diagram of one embodiment of the invention showing a reaction vessel containing one of the specific catalysts used herein.
Figure 2:
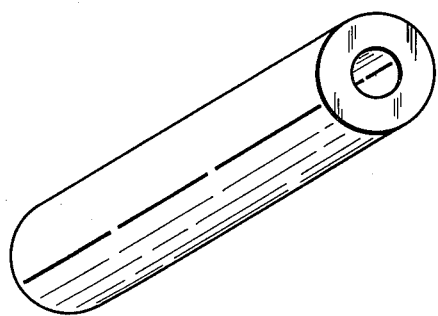
FIGS. 2 to 7 illustrate typical catalyst shapes that can be used in the process defined herein. In addition to the catalyst shapes shown in FIGS. 2 to 7, the catalyst can assume the shapes of Berl and Intalox saddles and Raschig rings and extruded stars.
Figure 3:
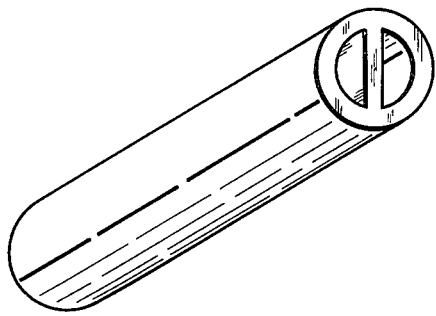
Figure 4:
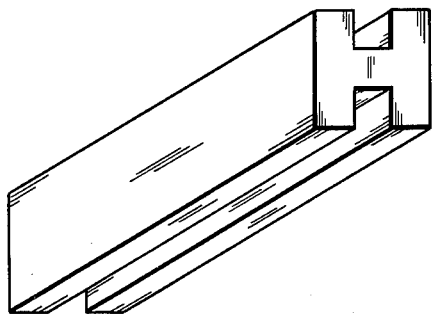
Figure 5:
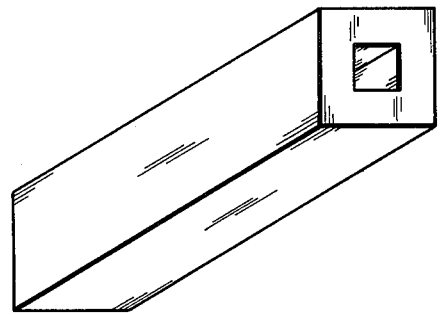
Figure 6:
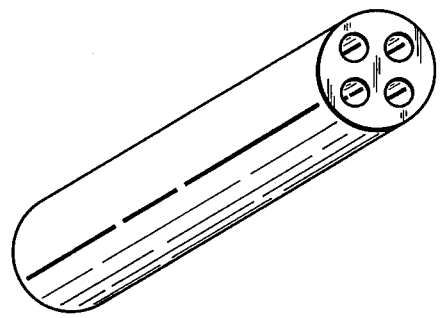
Figure 7:
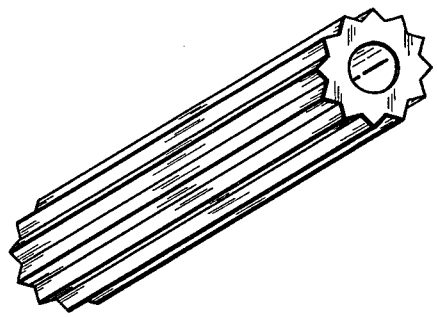

The catalyst employed can be of any suitable shape, but not spherical, that when indiscriminately mounted in the reaction vessel will suffice to provide the reactor void volume defined above and whose greatest or maximum wall thickness is within a range of about 1/32 to about ½ inch (about 0.079 to about 1.27 centimeters), preferably about 1/32 to about ¼ inch (about 0.079 to about 0.64 centimeters). By "wall thickness" we mean the thickness of the least thick portion of the catalyst particle cross section, excluding protrusions, for example, the points of a star. Thus, for example, in FIG. 2, the wall thickness would be one half the difference between the inner and outer particle diameter. In FIG. 5, the wall thickness would be one half the difference between the lengths of the sides of the inner and outer squares. For FIG. 7, the wall thickness would be one half the difference between the inner diameter and the diameter corresponding to the troughs between the points of the star. Wall thickness for other cases will be apparent from these examples to one skilled in the art. If a catalyst particle is provided with an opening extending therethrough, for example, a cylinder, which herein is a preferred embodiment, the opening therein can have a width of about 1/16 to about 1 inch (about 0.16 to about 2.54 centimeters), preferably about ⅛ to about ½ inch (about 0.32 to about 1.27 centimeters). The length to outer diameter (L/D) of such cylinders must be within a range of about 0.1:1 to about 5:1, preferably about 0.3:1 to about 2:1. The catalyst base, for example, can, as noted, be made into any desired shape and then impregnated or otherwise coated with the catalytic components in any suitable or convenient manner, or the base and catalytic components can be mixed together and then extruded or compacted into any suitable shape to provide the defined reactor void space when in use. Suitable catalyst shapes are exemplified in FIGS. 2 to 7. In reaction vessel 8 the catalyst particles are those shown in FIG. 2.

In accord with the process defined and claimed herein, the liquid hydrocarbon oil is effectively hydrogenated and converted to desired product in high yields and yet, surprisingly, though the present process involves the use of a fixed catalyst bed and the liquid hydrocarbon oil is obviously composed of a substantial amount of solids, we have not encountered an appreciable pressure drop across the catalyst bed nor undesirable attrition of the individual catalyst particles.

Gases from reaction vessel 8 are removed through line 16 to a gas recovery plant 18. Gas recovery plant 18 comprises any suitable means for separating gases from liquids. The gases separated in gas recovery plant 18 are passed through line 20 to a hydrogen plant 22 where hydrogen is recovered and any low molecular weight hydrocarbon gases are converted to hydrogen. Any liquids in gas recovery plant 18 can be removed therefrom by line 21 and passed to product storage 32. Depending upon economic considerations, the low molecular weight hydrocarbon gases can be sold and hydrogen generated by other satisfactory means, such as gasification of coal, or a product stream containing undesirable materials, such as high-boiling tars or waste solids, can be used as a hydrogen source. Hydrogen is then returned through line 4 to reaction vessel 8. Any make-up feed which is needed to supply hydrogen for the hydrogen plant is added through line 24. Liquid products containing some solid materials are removed from reaction vessel 8 through line 26 into a solids separation unit 28. If desired, solids separation unit 28 can be by-passed, in which case the liquid products removed from reaction vessel 8 can be passed directly by line 30 to a product storage unit 32. Solids separation unit 28 comprises any suitable means for separating solids from liquids, such as a continuous rotating filter, centrifuge or liquid cyclone. Solid materials are removed from the separation unit 28 through line 34.

The liquid product is removed from separation unit 28 through line 36 to product storage unit 32, from which liquid product can be removed through line 38. Optionally, the liquid product from storage unit 32 can be sent through line 40 to a distillation column train 42 where various cuts can be removed at desired pressure, usually under vacuum, for the recovery of specific distillation cuts which can then be passed through line 44 to a storage tank farm 46. The various products can then be removed through line 48. It is believed obvious to those having ordinary skill in the art that by varying the reaction conditions in reaction vessel 8, but within the range of conditions set forth above, more or less hydrocracking can occur, which would give more or less liquefied product and/or more or less lighter boiling products for distillation in distillation column train 42. It is also within the purview of the disclosure herein that product in line 26 containing solids be sent directly to a distillation column train wherein the component parts thereof can be separated into selected fractions.

DESCRIPTION OF PREFERRED EMBODIMENT

The process of this invention can be illustrated by the following:

EXAMPLE I 794 grams of catalyst were housed in a reactor having an internal diameter of 2⅜ inches (6.03 centimeters) to form a catalyst bed therein having a depth of 28 inches (71.12 centimeters). The catalyst shape was similar to that shown in FIG. 2 and had an outer diameter of 9.5 millimeters (⅜ inch), an inner diameter of 4.8 millimeters (3/16 inch) and an average length of 19.1 millimeters (¾ inch). The total catalyst bed volume was 711 cubic centimeters, while the total reactor volume occupied by the solid portion of the individual catalyst particles therein, not excluding the pores thereof, was 306 cubic centimeters, thus resulting in a reactor void volume of 57 percent. The catalyst was composed of alumina carrying on the surface thereof 9.5 percent by weight of a three-metal catalytic component. The catalytic component consisted of 1.0 weight percent cobalt, 0.5 weight percent nickel and 8.0 weight percent molybdenum. The charge subjected to hydrogenation in the above-defined reactor was a Paraho Shale Oil having a viscosity at 37.7° C. of 36.4 centistokes and at 99° C. of 4.76 centistokes, a gravity of 19.6°API, an ash content (solid or colloidal mineral dispersed or suspended in the shale oil) of 0.11 weight percent and analyzing 80.51 weight percent carbon, 11.38 weight percent hydrogen, 4.92 weight percent oxygen, 0.32 weight percent sulfur and 2.0 weight percent nitrogen. The shale oil, together with hydrogen, was charged upwardly through the catalyst bed at a temperature of 399° C. and a pressure of 3500 pounds per square inch gauge (246 kilograms per square centimeter). The hydrogen feed rate was 1780 cubic meters per cubic meter (10,000 standard cubic feet per barrel) of shale oil. The design shale oil feed rate was 7.7 pounds per hour (3.5 kilograms per hour) which resulted in a weight hourly space velocity (weight of shale oil per weight of catalyst per hour) of 4.4 kilograms of shale oil per hour kilogram of catalyst. The run was continued for 92 hours. The product was analyzed at the end of 8, 20, 40, 64 and 92 hours. The results obtained are summarized below in Table II. Also included in Table II is the analysis of the shale oil feed.

TABLE II

| Hours On Stream | Per Cent By Weight | | | | | Gravity ° API | Viscosity At 99° C., Centistokes |
|---|---|---|---|---|---|---|---|
| | Carbon | Hydrogen | Sulfur | Nitrogen | Oxygen | | |
| Feed | 80.51 | 11.38 | 0.32 | 2.0 | 4.92 | 19.6 | 4.80 |
| 8 | 84.51 | 11.38 | 0.09 | 0.99 | 0.08 | 29.4 | 2.74 |
| 20 | 85.81 | 12.61 | 0.12 | 1.04 | 0.1 | 29.1 | 2.87 |
| 44 | 85.75 | 12.70 | 0.14 | 1.01 | 0.2 | 29.0 | 2.86 |
| 64 | 85.78 | 12.59 | 0.07 | 1.17 | 0.17 | 28.3 | 2.99 |
| 92 | 85.81 | 12.59 | 0.20 | 1.18 | 0.27 | 28.0 | 2.98 |

During the run it was calculated that 359 grams of ash had been introduced into the reactor with the shale oil feed. At the end of the run 51 grams of ash were found to be present in the reaction bed, amounting to an entrapment therein of about 14 percent of all the ash entering the reaction bed.

From the above data it can be seen that the defined process is extremely effective in the hydrogenation of shale oil, in decreasing the sulfur, nitrogen and oxygen content thereof, in significantly increasing its gravity and in significantly reducing its viscosity. This effect is obtained with no significant plugging of the reactor. It is believed the 14 percent entrapment of solids during the course of the run represents steady state conditions, for it will be noted that the results obtained at the end of 92 hours are about as good as they were during the course of the run. This is a significant improvement over the conventional fixed bed reactor wherein the critical void volume herein is not present, for in such cases it is considered that a charge containing more than 20 parts per million of solids will tend to plug the reactor.

Obviously, many modifications and variations of the invention, as hereinabove set forth, can be made without departing from the spirit and scope thereof, and therefore, only such limitations should be imposed as are indicated in the appended claims.

We claim:

1. In a process wherein a solids-containing liquid hydrocarbon oil and hydrogen are contacted with a hydrogenation catalyst in a single stage to upgrade said liquid hydrocarbon oil the improvement which comprises passing said liquid hydrocarbon oil, together with said solids, and said hydrogen under hydrogenation conditions, which include a temperature of about 260° to about 480° C., a pressure of about 500 to about 10,000 pounds per square inch gauge, a weight hourly space velocity between about 0.25 to about 50 pounds of liquid hydrocarbon oil per pound of catalyst per hour and hydrogen in amounts between about 1000 to about 20,000 standard cubic feet per barrel of liquid hydrocarbon oil, while maintaining a Reynolds number, based on the hydrogen flow rate, greater than about 10, through the void spaces of a fixed catalyst bed composed of said hydrogenation catalyst under a flooded-bed type reaction system, the catalyst particles of said catalyst having a maximum wall thickness in the least thick portion thereof of about 1/32 to about ½ inch, said catalyst bed having a reactor void volume of about 50 to about 90 volume percent, and thereafter removing solids from said treated hydrocarbon oil.

2. The process of claim 1 wherein said maximum wall thickness is about 1/32 to about ¼ inch.

3. The process of claim 1 wherein said reactor void volume is about 50 to about 80 volume percent.

4. The process of claim 1 wherein the catalyst particle is provided with an opening extending therethrough having a width of about 1/16 to about one inch.

5. The process of claim 4 wherein the catalyst particle is provided with an opening extending therethrough having a width of about ⅛ to about ½ inch.

6. The process of claim 4 wherein the length to outer diameter of said catalyst particle is in the range of about 0.1:1 to about 5:1.

7. The process of claim 6 wherein the length to outer diameter of said catalyst particle is in the range of about 0.3:1 to about 2:1.

8. The process of claim 1 wherein said solids-containing liquid hydrocarbon oil is shale oil.

9. The process of claim 1 wherein said solids-containing liquid hydrocarbon oil is derived from coal.

10. The process of claim 1 wherein said solids-containing liquid hydrocarbon oil is derived from tar sands.

11. The process of claim 1 wherein said solids-containing hydrocarbon oil contains from about 0.1 to about 5 weight percent of solids.

12. The process of claim 1 wherein said solids-containing hydrocarbon oil contains from about 0.1 to about 2 weight percent of solids.

13. The process of claim 1 wherein the hydrogenating component of the catalyst is a sulfided combination of Group VI and VIII elements.

14. The process of claim 1 wherein the hydrogenating component of the catalyst is a sulfided combination of molybdenum, nickel and cobalt.

* * * * *